(12) United States Patent
Lee

(10) Patent No.: US 11,445,087 B2
(45) Date of Patent: Sep. 13, 2022

(54) SKEW COMPENSATION BASED ON SCALE FACTOR

(71) Applicant: Hewlett-Packard Development Company, L.P., Spring, TX (US)

(72) Inventor: Eul Hwan Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/278,375

(22) PCT Filed: Jul. 24, 2019

(86) PCT No.: PCT/US2019/043159
§ 371 (c)(1),
(2) Date: Mar. 22, 2021

(87) PCT Pub. No.: WO2020/153990
PCT Pub. Date: Jul. 30, 2020

(65) Prior Publication Data
US 2021/0360121 A1 Nov. 18, 2021

(30) Foreign Application Priority Data
Jan. 24, 2019 (KR) .................... 10-2019-0009455

(51) Int. Cl.
H04N 1/08 (2006.01)
H04N 1/387 (2006.01)
H04N 1/00 (2006.01)
H04N 1/393 (2006.01)

(52) U.S. Cl.
CPC ....... H04N 1/3878 (2013.01); H04N 1/00718 (2013.01); H04N 1/393 (2013.01)

(58) Field of Classification Search
CPC .................... H04N 1/3878; H04N 1/00718
See application file for complete search history.

(56) References Cited

U.S. PATENT DOCUMENTS

| | | |
|---|---|---|
| 9,998,628 B1 | 6/2018 | Palaniyappan et al. |
| 2004/0062455 A1 | 4/2004 | Rudak et al. |
| 2009/0185240 A1* | 7/2009 | Kato .................. H04N 1/00718 358/474 |
| 2010/0060943 A1 | 3/2010 | Monga et al. |
| 2010/0141991 A1* | 6/2010 | Yoshida ............... H04N 1/3878 358/1.18 |
| 2010/0189311 A1 | 7/2010 | Sacher et al. |
| 2013/0142396 A1 | 6/2013 | Fletcher et al. |
| 2017/0187916 A1 | 6/2017 | Ohta et al. |
| 2017/0213329 A1 | 7/2017 | Pollard et al. |
| 2017/0318164 A1 | 11/2017 | Ohmi et al. |
| 2018/0115670 A1 | 4/2018 | Gomez Lucia et al. |

* cited by examiner

*Primary Examiner* — Ibrahim Siddo
(74) *Attorney, Agent, or Firm* — Jefferson IP Law, LLP

(57) ABSTRACT

An example image scanning device includes an image sensor to scan a manuscript, a memory, and a processor to generate a scan image corresponding to the manuscript, perform rotation processing for the generated scan image using a scale factor, perform scaling processing for the rotated scan image, and store the scale-processed scan image in the memory.

15 Claims, 7 Drawing Sheets

| Input resolution | Output resolution | $s_x$ | $s_y$ | $s_y/s_x$ |
|---|---|---|---|---|
| 600x600 | 600x600 | 1 | 1 | 1 |
| 600x450 | 600x600 | 1 | $\frac{4}{3}$ | $\frac{4}{3}$ |
| 600x400 | 600x600 | 1 | $\frac{3}{2}$ | $\frac{3}{2}$ |
| 600x300 | 600x600 | 1 | 2 | 2 |
| 300x600 | 600x600 | 2 | 1 | $\frac{1}{2}$ |
| 300x450 | 600x600 | 2 | $\frac{4}{3}$ | $\frac{2}{3}$ |
| 300x400 | 600x600 | 2 | $\frac{3}{2}$ | $\frac{3}{4}$ |
| 300x300 | 600x600 | 2 | 2 | 1 |

SKEW COMPENSATION BASED ON SCALE FACTOR

BACKGROUND OF THE INVENTION

An image scanning device is a device for scanning an original image such as a document, a picture, a film, etc. and converting the original image into digital data. In this case, the digital data may be displayed on a monitor of a computer or printed by a printer to be generated as an output image. An example of such an image scanning device includes a printer, a scanner, a copier, a facsimile, and a multi-function peripheral (MFP) performing functions thereof in a complex manner through a single device.

BRIEF DESCRIPTION OF THE DRAWINGS

Various examples will be described below with reference to the accompanying drawings, in which:

FIG. 6 illustrates a scale factor corresponding to various input and output resolutions according to an example, and, FIG. 7 is a flowchart of a skew compensation method according to an example.

DETAILED DESCRIPTION

Certain examples will now be described with reference to the accompanying drawings. The examples described below may be modified in various different forms. In order to more clearly describe the features of the examples, a detailed description will be omitted for components or features well known to those of ordinary skill in the art to which the examples belong.

When the specification states that one constituent element is "connected to" another constituent element, it includes a case in which the two constituent elements are connected to each other with another constituent element intervened therebetween as well as a case in which the two constituent elements are directly connected to each other. Further, when one constituent element "comprises" another constituent element, unless specifically stated to the contrary, it includes a situation in which another constituent element may be further included rather than precluding the same.

The expression "image forming job" as used herein may refer to any of various jobs related with an image, such as, formation of an image or generation/storage/transmission of image files (e.g., copying, printing, scanning, or faxing), and the expression "job" as used herein may refer to not only the image forming job, but also a series of processes required for performance of the image forming job.

Further, the expression "image scanning device" as used herein may refer to an apparatus that scans an image of a document and generates a scanned image. Examples of an image scanning device may include a scanner, a copier, a printer, a facsimile, or a multi-function peripheral (MFP) implementing functions of the above. When the image scanning device is a copier, a facsimile, an MFP, or the like, which is capable of the image forming job, the image scanning device may also be referred to as the image forming apparatus.

Further, the expression "hard copy" as used herein may refer to an operation of outputting an image on a recording medium such as paper, and the expression "soft copy" as used herein may refer to an operation of outputting an image on a display device such as a TV, a monitor, or the like, or outputting the image to a memory.

Further, the expression "scanned data" as used herein may refer to a scan image generated at a scanner, may be a black and white image, a color image, or the like, and may have various forms of file formats (e.g., bitmap (BMP), joint photographic group (JPG), tagged image file format (TIFF), portable document format (PDF), or the like).

Further, the expression "user" as used herein may refer to a person who performs a manipulation related with an image forming job using an image scanning device or a device connected to the image scanning device in a wired or wireless manner. Further, the expression "manager" as used herein may refer to a person who has an authority to access all functions and systems of an image scanning device. The "manager" and the "user" may refer to the same person.

Figure 1:
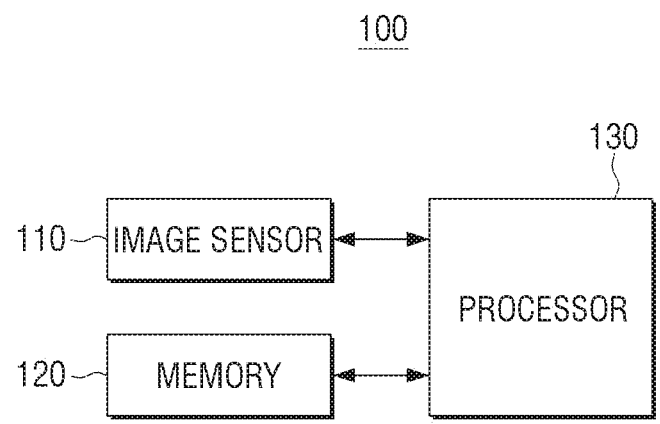
FIG. 1 is a block diagram of an image scanning device according to an example.

FIG. 1 is a block diagram of an image scanning device according to an example.

Referring to FIG. 1, an image scanning device 100 may include an image sensor 110, a memory 120, and a processor 130.

The image sensor 110 may scan a manuscript. For example, the image sensor 110 may scan image information of the manuscript from a light (or glow) reflected from the manuscript. The image sensor 110 may include a charge coupled device (CCD) disposed in a row along a main scanning direction or a plurality of CMOS image sensors (CIS). The image sensor 110 may be disposed on a lower end of a flatbed and disposed within an automatic document feeder (ADF).

The memory 120 may store data for image processing. For example, the memory 120 may store a program required to perform the image processing of the processor 130, or store a signal (for example, a scan image) scanned from the image sensor 110 or data (for example, skew-compensated image or scale-compensated image) processed by the processor 130 to be described later.

The memory 120 may be a volatile memory such as a dynamic random access memory (DRAM), a synchronous RAM (SRAM), or the like, or a non-volatile memory such as a hard disk drive (HDD), a solid state drive (SSD), a flash memory, or the like, or may be a combination of the volatile memory and the non-volatile memory.

The processor 130 may control each element within the image scanning device 100. In an example, the processor 130 may be implemented as a central processing unit (CPU), an application-specific integrated circuit (ASIC), or the like.

The processor 130 may determine a scan resolution. For example, the processor 130 may calculate the scan resolution (or input resolution) based on an output resolution and/or a scanning speed set by the user. For example, in a device with a resolution of 600×600 dpi, if the user selects a default speed, it may be determined that the scanning job is performed at 600×600 dpi resolution. If the speed is selected to be twice as fast, the processor 130 may perform a scanning job at resolution of 600×300 dpi, and enlarge and compensate the image scanned at 600×300 dpi resolution through image processing and output the image at 600×600 dpi.

The processor 130 may calculate a scale factor based on the output resolution and/or scan resolution.

The processor 130 may control the image sensor 110 to perform a scanning job according to the determined resolution and/or scanning speed set by the user.

The processor 130 may generate a scan image using the signal output from the image sensor 110. The processor 130 may store the generated scan image in the memory 120.

The processor 130 may determine whether image compensation is required for the scan image. For example, the processor 130 may confirm whether the output resolution and the scan resolution of the image sensor 110 are different, confirm whether scale compensation (or scale processing) is necessary, confirm whether skew exists in the scan image, and confirm whether skew compensation is required. For example, the processor 130 may detect an upper line of the manuscript in the generated scan image, calculate the skew angle (first rotation angle) using the angle of the detected upper line, and confirm whether skew compensation is necessary based on this angle. Here, the rotation angle is an angle for compensating the generated skew angle. For example, if the skew angle is $\theta_1$ in a clockwise direction, the rotation angle may be $\theta_1$ in a counterclockwise direction.

The processor 130 may determine whether scale compensation is necessary. For example, the processor 130 may determine whether the scan is performed in a form in which the horizontal and vertical ratios are not the same in the scanning process, or determine the resolution (or scale factor) in the scanning process and determine whether the scale compensation is necessary.

The processor 130 may determine an operation expression to be used in skew compensation when both scale compensation and skew compensation are required. For example, the processor 130 may determine whether to perform skew compensation according to an operation expression according to the calculated skew angle or perform skew compensation according to an approximated operation expression. An example operation expression to be used for skew compensation will be described later with reference to FIG. 3.

When both the scale compensation and the skew compensation are required, the processor 130 may rotate the generated scan image using the scale factor. For example, the processor 130 may calculate the second rotation angle considering the scale factor to the first rotation angle, and perform the rotation processing for the scan image using the calculated second rotation angle and the scale factor. Here, the scale factor corresponds to at least one of a scanning speed and the scan resolution, and may be defined as a separate value for each of the main scanning direction x and the sub-scanning direction y, or may be defined as a proportional value for the main scanning direction x and the sub-scanning direction y.

The processor 130 may perform rotation processing on the scan image using the corresponding operation expression according to the skew angle. For example, the processor 130 may perform rotation compensation based on Equation 2, which will be described later, and may perform operation processing more rapidly using an equation approximating Equation 2 for a small angle such as 5 degrees or less or 1 degree or less.

The processor 130 may perform scale compensation for the rotated scan image. For example, the processor 130 may perform a scale processing corresponding to the scale factor (or the actual output resolution) previously calculated for the rotated scan image. For example, if the scan image is reduced to ½ with respect to the vertical direction in the scan process, a scale processing that enlarges the scan image twofold in the vertical direction may be performed.

If additional image processing is to be performed, in addition to the skew compensation and scale compensation described above with respect to the scan image, the processor 130 may perform the additional image processing on the skew-compensated image and perform scale compensation on the image subject to the additional image processing and output the final image. Here, the additional image processing may be segmentation to distinguish the attributes per pixel, color correction, smoothing, sharpening, or the like.

In the above described example, skew compensation and additional image processing are performed using data prior to scaling, that is, data having a small size, and thus, image processing may be performed using a small memory and a quicker operation is available.

When image processing is completed, the processor 130 may store the scale-compensated image in the memory 120.

An example of an image scanning device has been described. However, in implementation, various configurations may be provided additionally. Example of such various configurations will be described with reference to FIG. 2.

Figure 2:
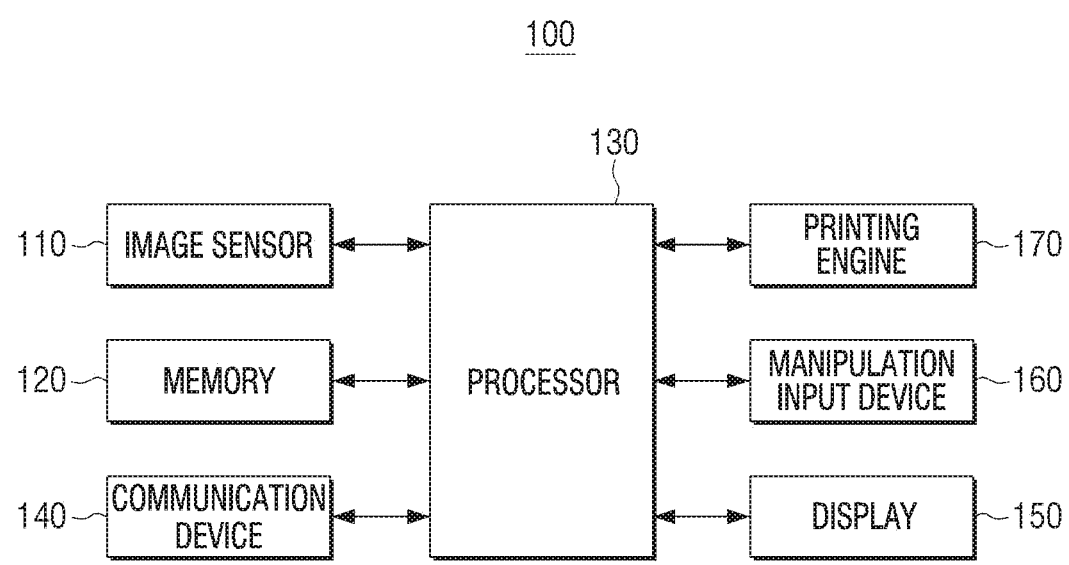
FIG. 2 is a block diagram of an image scanning device according to an example.

FIG. 2 is a block diagram of an image scanning device according to an example.

Referring to FIG. 2, the image scanning device 100 may include the image sensor 110, the memory 120, the processor 130, a communication device 140, a display 150, a manipulation input device 160, and a printing engine 170.

The operation of the image sensor 110 and the memory 120 has been described with reference to FIG. 1, and a redundant description will be omitted. The processor 130 is also described with reference to FIG. 1 and the contents described in FIG. 1 will not be again described. Rather, only the contents related to the configuration added in FIG. 2 will be described below.

The communication device 140 may be connected to a terminal (not illustrated) such as a mobile device (e.g., a smart phone, a tablet personal computer (PC)), a PC, a note book PC, a personal digital assistant (PDA), a digital camera, or the like, and transmit a scan image previously stored in the memory 120 or a compensated scan image to another terminal.

For example, the communication device 140 may be configured to connect the image scanning device 100 to an external device, and may not only be connected to a terminal through a local area network (LAN), an internet network, or the like, but also connected through a universal serial bus (USB) port, a wireless communication port (e.g., WiFi 802.11a/b/g/n, NFC, Bluetooth), or the like. The communication device 140 may be referred to as a communication interface, a transceiver, or the like.

The display 150 may display various pieces of information provided from the image scanning device 100. For example, the display 150 may display a user interface window to receive a selection of various functions provided by the image scanning device 100. The display 150 may be a monitor such as a liquid crystal display (LCD), a cathode-ray tube (CRT), a light emitting diode (LED), an organic LED (OLED), or the like, and may be implemented as a touch screen that may simultaneously perform a function of the manipulation input device 160 which will be described later.

Further, the display 150 may display a control menu for performance of functions of the image scanning device 100. Accordingly, a user may input a scan command on the displayed user interface window. In an example, the scan command may be a command to perform the scanning job and may include commands such as scan-to-server, scan-to-digital living network alliance (DLNA), scan-to-cloud, or the like, which transmits a scanning job to a server.

Further, when the image scanning device 100 is an MFP that includes printing and copying capabilities, the scan command may be a copy command that uses a scan function. Although it is described herein that a scan command is inputted through the manipulation input device 160, in another example, the scan command may be received from a terminal (not illustrated) through the communication device 140.

The display 150 may display the generated scan image and information about the scan image. In an example, the displayed scan image may be the scan image itself or a preview image for the scan image.

The display 150 may display a user interface window for receiving selection of an image processing method to be performed after scanning a manuscript. The user interface window may include an input area for receiving a resolution of an output image, a scanning speed, a scanning condition, or the like.

The manipulation input device 160 may receive from a user a function selection and a control command for the function. The function may include a print function, a copy function, a scan function, a fax transmission function, or the like. The manipulation input device 160 may be implemented as a plurality of buttons, a keyboard, a mouse, or the like, and may be implemented as a touch screen that may simultaneously perform functions of the display 150 described above.

The printing engine 170 may print a compensated scan image. The printing engine 170 may form an image on an image forming medium such as a photoconductive drum, an intermediate transfer belt, a paper feeding belt, and the like, transfer an image formed on the image forming medium on a print medium (e.g., paper), and perform a printing job.

When a copy command is received from a user, the processor 130 may control the image sensor 110 to perform a scanning job to generate a scan image, perform image compensation on the generated scan image, and control the printing engine 170 to print the compensated scan image.

Alternatively, when commands such as scan-to-server, scan-to-DLNA, scan-to-cloud, or the like are received from the user, the processor 130 may control the communication device 140 to transmit the compensated scan image to a storage corresponding to the command.

Although FIGS. 1 and 2 illustrate and describe certain functions of the image scanning device 100, the image scanning device 100 may further include a fax transceiver to perform a fax transceiving function, or the like, according to functions available in the image scanning device 100.

As described above, an example image scanning device may perform skew compensation first even when skew compensation for a scan image scanned with a different width/length ratio is necessary, that is, skew compensation and image processing with a smaller image is available. Therefore, skew compensation may be performed more rapidly with a smaller memory.

Hereinbelow, a reason why scale compensation is performed for a scan document is described, and a problem of applying a general skew compensation method to the scale-compensated scan image is described.

When scanning is performed at a speed higher than the speed of the image sensor 110, the manuscript is scanned by reducing the scanning resolution in the vertical direction (sub-scanning direction) compared to the horizontal direction (main scanning direction), the scan image is image-processed and enlarged in the vertical direction, and a scan image having the resolution desired by the user may be scanned rapidly.

For example, it may be supposed that the scanning speed of the image sensor 110 is required to be 60 images per minute (IPM), and the physical maximum speed of the image sensor 110 at 600×600 dpi is 30 IPM. In this case, the image sensor 110 may scan at a speed of 60 IPM at a resolution of 600×300 dpi. Therefore, a scan image may be obtained at 600×300 dpi, and the scan image may be scale-compensated. The scan image at a resolution of 600×300 dpi may be output as an output image at a resolution of 600×600 dpi.

In certain situations, a printing paper may not be aligned due to deviation of a disposition of sensors, characteristics of devices such as roller and motor movements, etc. causing misalignment of the printing paper. Accordingly, a skew in which the scan image is distorted to be different from the manuscript may occur.

When the skew is generated when a scanning job is performed by lowering a vertical resolution in order to obtain a high scanning speed as described above, a scaling needs to be performed first, and a skew compensation should be performed on the scale-compensated image. An example of this process is described below with reference to FIG. 3.

Figure 3:
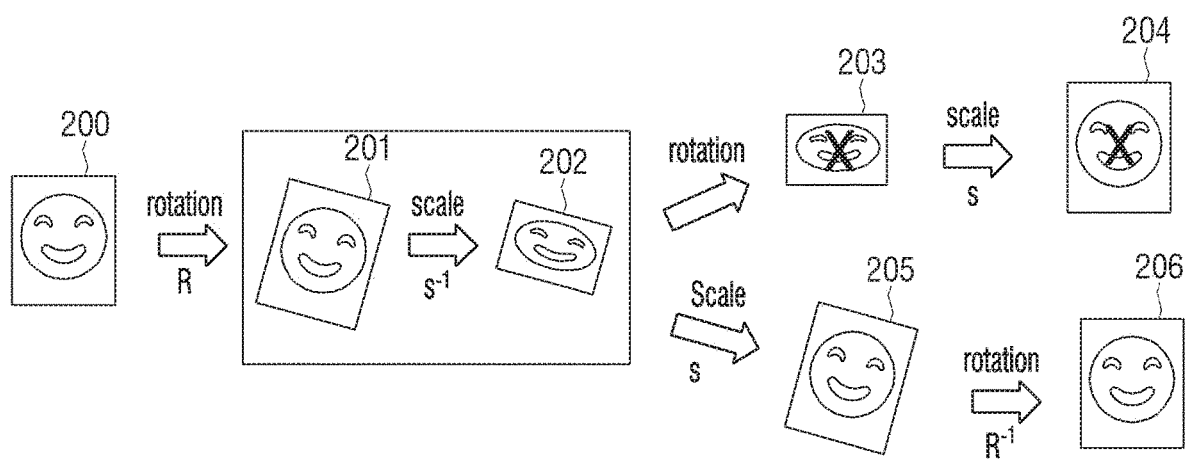
FIG. 3 illustrates a relation between skew compensation and scale compensation according to an example.

FIG. 3 illustrates a relation between skew compensation and scale compensation according to an example.

Referring to FIG. 3, the image sensor 110 outputs a scan image 202 obtained by scanning the manuscript 200. The scan image 202 has a distorted shape as shown in FIG. 3. In the image scanning device 100, the manuscript 200 may not be aligned due to a deviation in the arrangement of the sensors, mechanical characteristics such as rollers and motor movements, etc., and thus the scan image 202 may be distorted to be different from the manuscript 200.

For example, when the manuscript 200 is not aligned with the image sensor 110, the image sensor 110 scans a deformed manuscript 201. When the distorted manuscript 201 is scaled (for example, reduced) and scanned, a rotated and shortened scan image 202 in the vertical direction is generated.

In order to compensate the scan image, the processor 130 needs to perform scale compensation for the scan image 202, output an enlarged scan image 205, perform skew compensation for the enlarged scan image 205, and output a final image 206.

However, for the scan image 202, when rotation processing (or skew compensation processing) is performed first 203 and then scale compensation is performed 204, the same result as the final image 206 as described above may not be obtained.

In more detail, rotation and scale processing are a kind of affine transformation commonly used in computer graphics and may be expressed in a matrix form. Examples of affine transformations include translation, rotation, scaling such as increasing/decreasing, reflection, shear, and the like. Such affine transforms may be represented by multiplying of the matrix. However, the scale processing and rotation processing do not have a commutative property. Here, the commutative property satisfies S*R=R*S in the two matrices S and R. In other words, the order is important.

Since the scale processing and the rotation processing do not apply the commutative property, in order to correctly compensate the skewed and scaled distorted image, the scale compensation needs to be performed first, and then the skew compensation process needs to be performed.

When various image processing such as scale, rotation, and division is performed by hardware, the processor 130 needs a process to read and write necessary data in the memory 120. Therefore, if the size of the image is large, the number of times of reading and writing data stored in the memory 120 increases, and a high memory bandwidth is required. In particular, in the image processing using neighboring peripheral pixels, the processor 130 processes image data in units of tiles to save internal memory. This operation requires reading of peripheral pixel data and thus requires more memory access and high speed data processing.

In this regard, an example method of performing rotation processing and additional image processing for scan data read at low resolution and finally performing scale-compensation is provided.

In examples of the disclosure, so that the skew compensation is performed first, skew compensation is performed using a scale factor value that is used for a scale compensation operation which is performed for subsequent operations.

For example, the processor 130 may perform skew compensation (i.e., rotation processing) using the scale factor for the distorted scan image 202. The processor 130 may then perform scale compensation (e.g., enlargement scaling) on the skew-compensated image. In implementation, additional image processing may be performed between the skew compensation and the scale compensation.

Hereinbelow, an example operation for skew compensation using the scale factor will be described.

Figure 4:
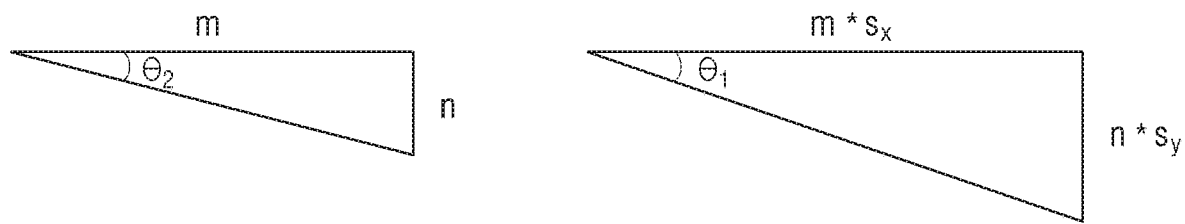
FIG. 4 illustrates a skew angle before scale compensation and a skew angle after scale compensation according to an example.

FIG. 4 illustrates a skew angle before scale compensation and a skew angle after scale compensation according to an example.

The processor 130 may first confirm a scale factor. For example, the processor 130 may confirm the scale factor according to the scan resolution requested by the user and the output resolution. Here, the scale factor may be calculated for each of the horizontal direction (main scanning direction) and the vertical direction (sub-scanning direction) and may be calculated as a ratio of the horizontal direction to the vertical direction. An example of such a ratio is shown in FIG. 6.

When the scale factor is confirmed, the processor 130 may calculate the skew angle ($\theta_1$). For example, the manuscript is rotated at the first skew angle ($\theta_1$) and scaled in this state. The second skew angle ($\theta_2$) in the scaled scan image 202 may be different from the first skew angle ($\theta_1$). For example, the first skew angle ($\theta_1$) and the second skew angle ($\theta_2$) are the same when the horizontal and vertical ratios are both reduced or enlarged equally. However, if the horizontal and vertical ratios are different, the second skew angle ($\theta_2$) is different from the first skew angle ($\theta_1$).

The processor 130 may not detect the first skew angle ($\theta_1$) immediately, and thus may detect the second skew angle ($\theta_2$) on the scan image 202 first. For example, the processor 130 may detect the upper line of the manuscript on the scan image 202 and detect the second skew angle ($\theta_2$) using the angle of the detected upper line.

The processor 130 may calculate a rotation center point ($x_{c2}$, $y_{c2}$).

The processor 130 may calculate the first skew angle ($\theta_1$) at a second skew angle ($\theta_2$) using a scale factor ($s_x$, $s_y$) (or $s_x/s_y$). For example, as shown in FIG. 4, the scan image 202 and the skew image 201 have an association as illustrated. In consideration of the foregoing, the first skew angle ($\theta_1$) may be calculated using Equation 1.

$$\theta_1 = \tan^{-1}\left(\frac{s_y}{s_x} * \tan\theta_2\right) \quad \text{Equation 1}$$

Here, $\theta_1$ is the first skew angle which is the angle in the image 201, $\theta_2$ is the second skew angle which is the angle in the image 202, $s_y$ is a scale factor of the y axis, and $s_x$ is a scale factor of the x axis. The scale factor may be referred to as $s_y/s_x$ proportional scale factor.

As described above, when the first skew angle ($\theta_1$) is calculated, the processor 130 may perform rotation processing using Equation 2 as shown below.

$$\begin{pmatrix} x_3 \\ y_3 \end{pmatrix} = \begin{pmatrix} \cos\theta_1 & -\frac{s_y}{s_x}*\sin\theta_1 \\ \frac{s_x}{s_y}*\sin\theta_1 & \cos\theta_1 \end{pmatrix} \begin{pmatrix} x_2 \\ y_2 \end{pmatrix} + \quad \text{Equation 2}$$

$$\begin{pmatrix} (1-\cos\theta_1)*x_{c2} + \frac{s_y}{s_x}*\sin\theta_1*y_{c2} \\ -\frac{s_x}{s_y}*\sin\theta_1*x_{c2} + (1-\cos\theta_1)*y_{c2} \end{pmatrix}$$

Here, ($x_3$, $y_3$) is an output coordinate of the skew-compensated image, ($x_2$, $y_2$) is a coordinate of the scan image 202, $\theta_1$ is the first skew angle, and ($x_{c2}$, $y_{c2}$) is the rotation center point in the scan image 202.

If the calculated first skew angle $\theta_1$ is equal to or less than 1 degree, skew compensation using an approximated equation may be performed as in Equation 3.

$$\begin{pmatrix} x_3 \\ y_3 \end{pmatrix} = \begin{pmatrix} 1 & -\left(\frac{s_y}{s_x}\right)^2*\theta_2 \\ \theta_2 & 1 \end{pmatrix} \begin{pmatrix} x_2 \\ y_2 \end{pmatrix} + \begin{pmatrix} \left(\frac{s_y}{s_x}\right)^2*\theta_2*y_{c2} \\ -\theta_2*x_{c2} \end{pmatrix} \quad \text{Equation 3}$$

Hereinbelow, an example process of obtaining Equation 2 and Equation 3 will be described.

In order to facilitate the description, coordinates and images of the manuscript 200 of FIG. 3 are indicated as $I_0(x_0, y_0)$, the skew image 201 is indicated as $I_1(x_1, y_1)$, the scan image 202 is indicated as $I_2(x_2, y_2)$, the skew-compensated image 203 is indicated as $I_3(x_3, y_3)$, and the scale-compensated image 204 is indicated as $I_4(x_4, y_4)$.

Equation 2 described above is a matrix for converting the skew-compensated image in the scan image 202 in consideration of the scale factor. The image 204, which is obtained after the skew compensation and scale compensation, is the same as the manuscript 200 or an output 206 of the conventional method.

Conversion from the skew-compensated image 203 to the scale-compensated image 204 may be performed using Equation 4.

$$\begin{pmatrix} x_4 \\ y_4 \end{pmatrix} = S \begin{pmatrix} x_3 \\ y_3 \end{pmatrix} \quad \text{Equation 4}$$

Here, S represents a scale matrix as in Equation 5.

$$S = \begin{pmatrix} s_x & 0 \\ 0 & s_y \end{pmatrix} \quad \text{Equation 5}$$

Here, $s_x$ is a scale factor in the horizontal direction, and $s_y$ is a scale factor in the vertical direction. For example, if the horizontal direction is enlarged two times (200%) and the vertical direction is enlarged 1.5 times (150%), $s_x=2$ and $s_y=1.5$.

Inverse conversion of Equation 4 may be indicated as Equation 6 below.

$$\begin{pmatrix} x_3 \\ y_3 \end{pmatrix} = S^{-1} \begin{pmatrix} x_4 \\ y_4 \end{pmatrix} \quad \text{Equation 6}$$

Here, $S^{-1}$ is the inverse matrix of S and may be indicated as Equation 7.

$$S^{-1} = \begin{pmatrix} \frac{1}{s_x} & 0 \\ 0 & \frac{1}{s_y} \end{pmatrix} \quad \text{Equation 7}$$

The scale-compensated image 204 should be the same as the manuscript 200, and Equation 6 should satisfy Equation 8 as follows.

$$\begin{pmatrix} x_3 \\ y_3 \end{pmatrix} = S^{-1} \begin{pmatrix} x_0 \\ y_0 \end{pmatrix} \quad \text{Equation 8}$$

In this environment, if assuming that the skew image 201 is rotated by $\theta_1$ in the clockwise direction with respect to $(x_{c1}, y_{c1})$ in this circumstance, the skew image 201 may be indicated as Equation 9 with respect to the manuscript 200.

$$\begin{pmatrix} x_1 \\ y_1 \end{pmatrix} = R \begin{pmatrix} x_0 - x_{c1} \\ y_0 - y_{c1} \end{pmatrix} + \begin{pmatrix} x_{c1} \\ y_{c1} \end{pmatrix} \quad \text{Equation 9}$$

Here, R indicates a rotation matrix, and may be indicated as Equation 10.

$$R = \begin{pmatrix} \cos\theta_1 & \sin\theta_1 \\ -\sin\theta_1 & \cos\theta_1 \end{pmatrix} \quad \text{Equation 10}$$

Here, $\theta_1$ is the first skew angle.

The reverse conversion in association with Equation 9 may be indicated as Equation 11 as shown below.

$$\begin{pmatrix} x_0 \\ y_0 \end{pmatrix} = R^{-1} \begin{pmatrix} x_1 - x_{c1} \\ y_1 - y_{c1} \end{pmatrix} + \begin{pmatrix} x_{c1} \\ y_{c1} \end{pmatrix} \quad \text{Equation 11}$$

The inverse matrix ($R^{-1}$) of the rotation matrix is shown in Equation 12. This indicates rotation in a clockwise direction by $-(\theta_1)$.

$$R^{-1} = \begin{pmatrix} \cos\theta_1 & -\sin\theta_1 \\ \sin\theta_1 & \cos\theta_1 \end{pmatrix} \quad \text{Equation 12}$$

Conversion from the skew image 201 to the scan image 202 is as shown in Equation 13.

$$\begin{pmatrix} x_2 \\ y_2 \end{pmatrix} = S^{-1} \begin{pmatrix} x \\ y_1 \end{pmatrix} \quad \text{Equation 13}$$

The inverse conversion with respect to Equation 13 is indicated as Equation 14.

$$\begin{pmatrix} x_1 \\ y_1 \end{pmatrix} = S \begin{pmatrix} x_2 \\ y_2 \end{pmatrix} \quad \text{Equation 14}$$

When substituting Equation 11 to Equation 8, Equation 15 is obtained, and when substituting Equation 14 to Equation 15, Equation 16 is obtained.

$$\begin{pmatrix} x_3 \\ y_3 \end{pmatrix} = S^{-1} \left( R^{-1} \begin{pmatrix} x_1 - x_{c1} \\ y_1 - y_{c1} \end{pmatrix} + \begin{pmatrix} x_{c1} \\ y_{c1} \end{pmatrix} \right) = \quad \text{Equation 15}$$
$$S^{-1} R^{-1} \begin{pmatrix} x_1 \\ y_1 \end{pmatrix} - S^{-1} \left( R^{-1} \begin{pmatrix} x_{c1} \\ y_{c1} \end{pmatrix} - \begin{pmatrix} x_{c1} \\ y_{c1} \end{pmatrix} \right)$$

$$\begin{pmatrix} x_3 \\ y_3 \end{pmatrix} = S^{-1} R^{-1} S \begin{pmatrix} x_2 \\ y_2 \end{pmatrix} - S^{-1} \left( R^{-1} \begin{pmatrix} x_{c1} \\ y_{c1} \end{pmatrix} - \begin{pmatrix} x_{c1} \\ y_{c1} \end{pmatrix} \right) \quad \text{Equation 16}$$

The relation of the coordinates of the center point is as shown in Equation 17, and if Equation 17 is reflected to Equation 16, Equation 2 described above is obtained.

$$\begin{pmatrix} x_{c1} \\ y_{c1} \end{pmatrix} = S \begin{pmatrix} x_{c2} \\ y_{c2} \end{pmatrix} \quad \text{Equation 17}$$

Equation 2 described above may be simplified through various assumptions. If assuming that the center of rotation is the origin, Equation 2 may be indicated as Equation 18.

$$\begin{pmatrix} x_3 \\ y_3 \end{pmatrix} = \begin{pmatrix} \cos\theta_1 & -\frac{s_y}{s_x}*\sin\theta_1 \\ \frac{s_x}{s_y}*\sin\theta_1 & \cos\theta_1 \end{pmatrix} \begin{pmatrix} x_2 \\ y_2 \end{pmatrix} \quad \text{Equation 18}$$

When the first skew angle is 1 degree or less, it is possible to assume that $\sin\theta \approx \theta$, $\cos\theta \approx 1$, $\tan\theta \approx \theta$, $\tan^{-1}\theta \approx \theta$, and it is also possible to indicate the first skew angle and the second skew angle as $$\theta_1 \approx \frac{s_y}{s_x} * \theta_2.$$

Therefore, when the skew angle is 1 degree or less, Equation 2 may be indicated as Equation 3 described above.

When the first skew angle is 1 degree or less, and the rotation center point is the origin, Equation 2 may be indicated as Equation 19 below.

$$\begin{pmatrix} x_3 \\ y_3 \end{pmatrix} = \begin{pmatrix} 1 & -\left(\frac{s_y}{s_x}\right)^2 * \theta_2 \\ \theta_2 & 1 \end{pmatrix} \begin{pmatrix} x_2 \\ y_2 \end{pmatrix} \quad \text{Equation 19}$$

Meanwhile, skew mostly has an angle of less than 5 degrees. When the skew angle is 5 degrees, it may be assumed that $\sin\theta \approx \theta$, $\tan\theta \approx \theta$, $\tan_{-1}\theta \approx \theta$, and it is possible to indicate the first skew angle and the second skew angle as $$\theta_1 \approx \frac{s_y}{s_x} * \theta_2.$$

When the skew angle is 5 degrees or less, Equation 2 may be indicated as Equation 20 below.

$$\begin{pmatrix} x_3 \\ y_3 \end{pmatrix} = \begin{pmatrix} \cos\theta_1 & -\left(\frac{s_y}{s_x}\right)^2 * \theta_2 \\ \theta_2 & \cos\theta_1 \end{pmatrix} \begin{pmatrix} x_2 \\ y_2 \end{pmatrix} + \quad \text{Equation 20}$$

$$\begin{pmatrix} (1-\cos\theta_1)*x_{c2} + \left(\frac{s_y}{s_x}\right)^2 * \theta_2 * y_{c2} \\ -\theta_2 * x_{c2} + (1-\cos\theta_1)*y_{c2} \end{pmatrix}$$

When the first skew angle is 5 degrees or less and the rotation center point is the origin, Equation 2 may be indicated as Equation 21 below.

$$\begin{pmatrix} x_3 \\ y_3 \end{pmatrix} = \begin{pmatrix} \cos\theta_1 & -\left(\frac{s_y}{s_x}\right)^2 * \theta_2 \\ \theta_2 & \cos\theta_1 \end{pmatrix} \begin{pmatrix} x_2 \\ y_2 \end{pmatrix} \quad \text{Equation 21}$$

Accordingly, the processor 130 may perform skew compensation of the scan image using any one of the above-described Equations 2, 3, 18, 19, 20, or 21. The scan image compensated by the above equations takes the scale factor into consideration, and even if scale processing is performed after the skew processing, there is no image distortion as in the conventional case.

Figure 5:
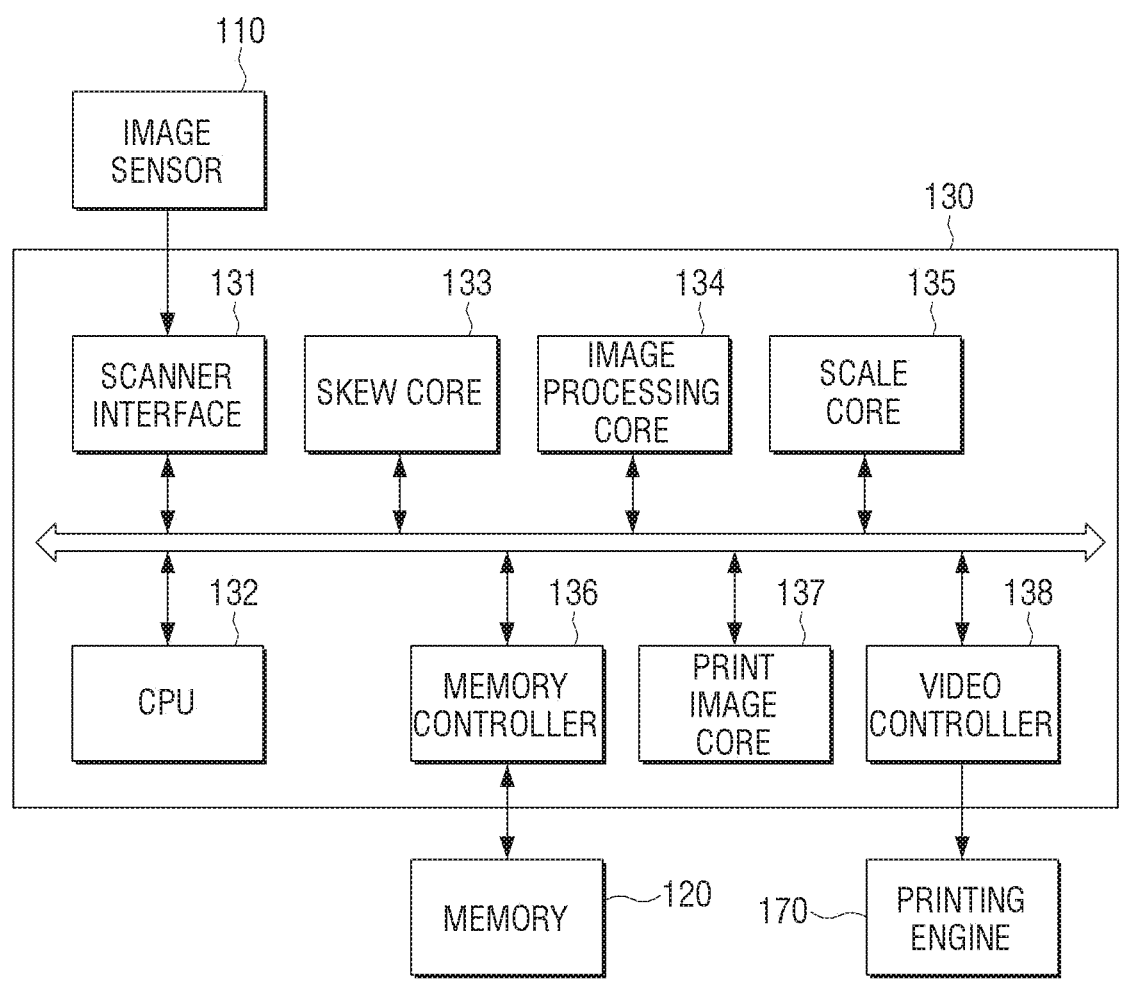
FIG. 5 illustrates a processor of according to an example.

FIG. 5 illustrates a processor according to an example.

Referring to FIG. 5, the processor 130 may include a scanner interface 131, a CPU 132, a skew core 133, an image processing core 134, a scale core 135, a memory controller 136, a print image core 137, and a video controller 138. The processor 130 may be an application specific integrated circuit (ASIC) or a system on chip (SoC).

The scanner interface 131 communicates with the image sensor 110 and receives a scan image.

The CPU 132 may control an operation of the processor 130. As an example, the CPU 132 may control the scanner interface 131 to read the information of the image sensor 110 corresponding to a scan resolution or a scanning speed and control the memory controller 136 to store the read information in the memory 120. When the skew compensation is required, the CPU 132 may control the skew core 133 to perform skew compensation using a scale factor.

The skew core 133 performs skew-related image processing. For example, the skew core 133 may calculate a skew angle and perform skew compensation on the scan image using the calculated skew angle and scale factor.

The image processing core 134 may perform additional image processing on the skew-compensated image. For example, the image processing core 134 may perform image processing, such as segmentation to distinguish attributes per pixel, color correction, smoothing, sharpening, or the like.

The scale core 135 may perform scale processing for the skew-compensated image or the image for which additional image processing is performed. For example, the scale core 135 may perform scale processing corresponding to the scale factor with respect to the skew-compensated image.

The memory controller 136 communicates with the memory 120. As an example, the memory controller 136 may transceive data with the memory 120 according to the control of the CPU 132, or transceive data in a direct memory access (DMA) method.

The print image core 137 performs operations related to a print job. For example, when print data is received, the print image core 137 may perform a rendering operation on the received print data and generate a bitmap image.

The video controller 138 controls the printing engine 170. For example, the video controller 138 may convert a generated bitmap image into a video signal and transmit the converted video signal to the printing engine 170.

FIG. 6 illustrates a scale factor corresponding to various input and output resolutions according to an example.

Referring to FIG. 6, a scale factor in the horizontal direction ($s_x$), a scale factor in the vertical direction ($s_y$), and a width to length ratio scale ($s_y/s_x$) factor for each of the input resolution and the output resolution are illustrated.

For example, when the input resolution is 600×300 and the output resolution is 600×600, the horizontal scale is 1 and the vertical scale is 2. As shown in Equations 2 and 3 above, the scale factors are reflected in the horizontal and vertical ratios in the Equations. Therefore, in example implementations, the horizontal scale factor and the vertical scale factor may not be calculated respectively, and one ratio scale factor may be used.

Figure 7:
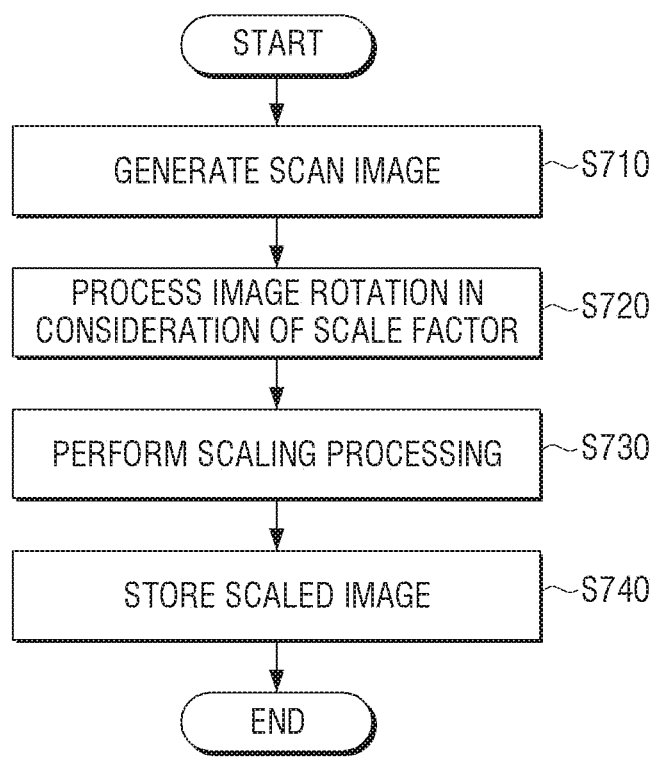

FIG. 7 is a flowchart of a skew compensation method according to an example.

Referring to FIG. 7, a scan image is generated in operation S710. As an example, a manuscript may be scanned based on at least one of a scanning speed and an input scan resolution, and a scan image may be generated.

The generated scan image is rotated using a predetermined scale factor in step S720. The scale factor corresponds to at least one of a scanning speed and an input scan resolution. For example, a first rotation angle is calculated using the generated scan image, a second rotation angle considering the scale factor at the calculated first rotation angle is calculated, and rotation processing of the scan image using the calculated second rotation angle and the scale factor may be performed.

Scale processing is performed for the rotated scan image in step S730. For example, the rotated scan image may be scale-processed using a scale factor. If additional image processing is required, additional image processing may be performed before the rotation processing, and the image subjected to the additional image processing may be subjected to the scale processing.

The scale-processed scan image is stored in step S740.

According to an example, the skew compensation method may perform skew compensation first even if a scan image has a different width/length resolution. Accordingly, the scaling operation may be performed later, and the image processing prior to the scaling operation may be processed more rapidly using fewer resources.

The examples of skew compensation methods described above may be embodied as a program and provided to a management server. As an example, a program including the skew compensation method may be stored in a non-transitory computer readable medium and provided.

The foregoing examples and advantages are merely exemplary and are not to be construed as limiting. The examples may be readily applied to other types of devices or apparatuses. Also, the description of the examples is intended to be illustrative, and not to limit the scope of the inventive concept, and many alternatives, modifications, and variations will be apparent to those skilled in the art.

What is claimed is:

1. An image scanning device, comprising:
   an image sensor to scan a manuscript;
   a memory; and
   a processor to:
     generate a scan image corresponding to the manuscript,
     perform rotation processing for the generated scan image using a scale factor,
     perform scaling processing for the rotated scan image, and
     store the scale-processed scan image in the memory.

2. The image scanning device of claim 1, wherein the processor is to:
   control the image sensor to scan the manuscript based on at least one of a scanning speed or an input scan resolution, and
   perform the rotation processing for the scan image using the scale factor corresponding to the at least one of the scanning speed or the input scan resolution.

3. The image scanning device of claim 1, wherein the processor is to:
   calculate a second rotation angle using the generated scan image,
   calculate a first rotation angle by taking into account the scale factor to the calculated second rotation angle, and
   perform rotation processing for the scan image using the calculated first rotation angle and the scale factor.

4. The image scanning device of claim 3, wherein the processor is to:
   detect an upper line of the manuscript in the generated scan image, and
   calculate the first rotation angle using an angle of the detected upper line.

5. The image scanning device of claim 1, wherein the processor is to:
   perform additional image processing for the rotated scan image, and
   perform scaling processing for the scan image for which additional image processing is performed.

6. The image scanning device of claim 5, wherein the additional image processing includes at least one of segmentation to distinguish attributes by pixels, color correction, smoothing, or sharpening.

7. The image scanning device of claim 1, wherein the generated scan image has a resolution in a main scanning direction which is different from a resolution in a sub-scanning direction.

8. A skew compensation method of an image scanning device, the method comprising:
   generating a scan image;
   performing rotation processing for the generated scan image using a scale factor;
   performing scaling processing for the rotated scan image; and
   storing the scale-processed scan image.

9. The skew compensation method of claim 8,
   wherein the generating comprises scanning a manuscript based on at least one of a scanning speed or an input scan resolution and generating the scan image, and
   wherein the performing of the rotation processing comprises performing rotation processing for the scan image using the scale factor corresponding to the at least one of the scanning speed or the input scan resolution.

10. The skew compensation method of claim 8, wherein the performing of the rotation processing comprises:
    calculating a second rotation angle using the generated scan image;
    calculating a first rotation angle in consideration of the scale factor to the calculated second rotation angle; and
    performing rotation processing for the scan image using the calculated first rotation angle and the scale factor.

11. The skew compensation method of claim 10, wherein the calculating of the first rotation angle comprises:
    detecting an upper line of a manuscript in the generated scan image and calculating the first rotation angle using an angle of the detected upper line.

12. The skew compensation method of claim 8, further comprising:
    performing additional image processing for the rotated scan image,
    wherein the performing of the scaling processing comprises performing a scaling operation for the scan image for which additional image processing is performed.

13. The skew compensation method of claim 12, wherein the additional image processing includes at least one of segmentation to distinguish attributes by pixels, color correction, smoothing, or sharpening.

14. The skew compensation method of claim 8, wherein the generated scan image has a resolution in a main scanning direction which is different from a resolution in a sub-scanning direction.

15. A non-transitory computer-readable recording medium including a program for executing a skew compensation method, the non-transitory computer-readable recording medium comprising:
    instructions to perform rotation processing for a scan image using a scale factor;
    instructions to perform scaling processing for the rotated scan image; and
    instructions to store the scale-processed scan image.

* * * * *